United States Patent [19]

Buglione et al.

[11] Patent Number: 4,532,907
[45] Date of Patent: Aug. 6, 1985

[54] SELECTIVE SINGLE FIRE/DOUBLE FIRE FUEL INJECTION CONTROL

[75] Inventors: Arthur J. Buglione, Garden City; James M. Coats, Dearborn, both of Mich.

[73] Assignee: Ford Motor Company, Dearborn, Mich.

[21] Appl. No.: 650,399

[22] Filed: Sep. 14, 1984

[51] Int. Cl.³ .............................................. F02M 51/02
[52] U.S. Cl. ..................................... 123/490; 123/478
[58] Field of Search ................................. 123/478, 490

[56] References Cited

U.S. PATENT DOCUMENTS

| 3,587,536 | 6/1971 | Inoue et al. | 123/490 |
| 4,020,802 | 5/1977 | Hattori et al. | 123/490 |
| 4,174,681 | 11/1979 | Luchaco | 123/490 X |
| 4,196,702 | 4/1980 | Bowler | 123/490 X |
| 4,200,063 | 4/1980 | Bowler | 123/478 |
| 4,485,791 | 12/1984 | Sugo et al. | 123/490 X |

FOREIGN PATENT DOCUMENTS 2063520  6/1981  United Kingdom ................ 123/478

Primary Examiner—Tony M. Argenbright
Attorney, Agent, or Firm—Peter Abolins; Robert D. Sanborn

[57] ABSTRACT

An engine control system for controlling a fuel injector in response to a desired fuel flow magnitude provides selective switching between firing a fuel injector once and more than once during each engine cycle. At low fuel flow rates, fuel injector operation can be maintained in a linear portion of the fuel injector characteristics by using only one fuel injector firing during an engine cycle.

5 Claims, 7 Drawing Figures

SELECTIVE DOUBLE FIRING

SELECTIVE SINGLE FIRING

ASYNCHRONOUS FIRING

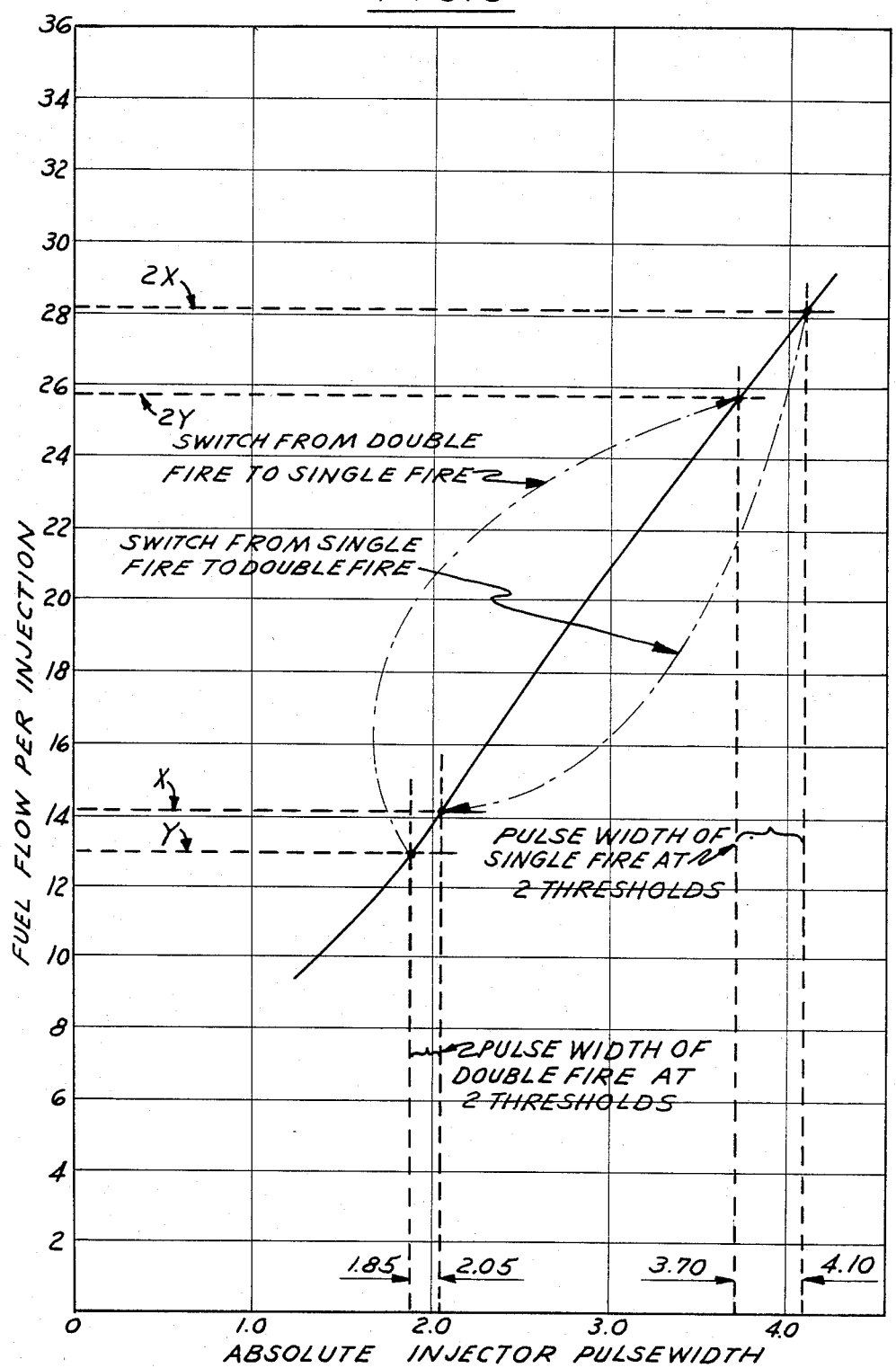

SELECTIVE SINGLE FIRE/DOUBLE FIRE FUEL INJECTION CONTROL

BACKGROUND OF THE INVENTION

1. Field of the Invention

This invention relates to controlling fuel in an internal combustion engine.

2. Prior Art

Various ways of controlling fuel to be injected into an engine are known. For example, it is known to inject fuel so that some fuel is available during each intake cycle of a four-cycle internal combustion engine. Further, it is known to control the amount of fuel injected during each injection so as to control engine performance and engine operating parameters such as the air fuel ratio. When performing such injections, it is desirable to operate within the linear portion of the fuel injector. That is, the portion of the injector curve where there is a linear relationship between the fuel flow delivered by the injector and the pulse width of the current energizing the fuel injector.

It is known that at relatively low fuel flow rates there may be a nonlinearity in the injector fuel flow characteristics. It would be desirable to avoid operating a fuel injector in such a nonlinear region. This may not be possible because the injector is typically required to provide a relatively large range of fuel flow ranging from very small fuel flow at idle to very large fuel flow at wide open throttle. These are some of the problems this invention overcomes.

SUMMARY OF THE INVENTION

In order to provide a relatively large fuel flow at wide open throttle and to provide a linearly controllable air fuel ratio at relatively low fuel flow rates, this invention teaches selectively switching between firing a fuel injector once and more than once during each engine cycle. At low air flow rates, fuel injection occurs only once during each engine cycle so that the pulse width applied to the fuel injector can be sufficiently wide to avoid the nonlinear region of the injector. Higher fuel flow rates are provided by multiple firing of the fuel injector during each engine cycle. As a result, there is available an advantageously large range of fuel flow in the linear region of operation of a fuel injector. The range extends from the relatively small amount provided by the smallest pulse width in the range of linear operation to the relatively large amount provided by two applications of the largest pulse width in the range of linear operation.

BRIEF DESCRIPTION OF THE DRAWINGS

FIG. 5 is a graphical representation of fuel flow per injection versus the actual absolute injector pulse width, including an indication of the pulse width change when switching between single fire and double fire at the injector pulse width limits of single fire and double fire operation.

DETAILED DESCRIPTION OF THE INVENTION

Figure 1:
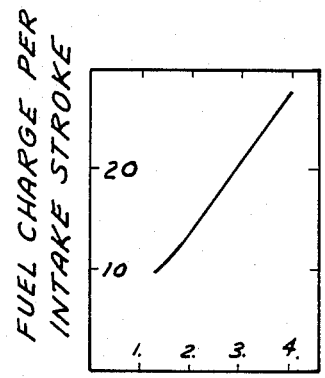
FIG. 1 is a graphical representation of fuel flow during an injection versus pulse width for a fuel injector including a nonlinear portion at low fuel flow rates.
Figure 2A:
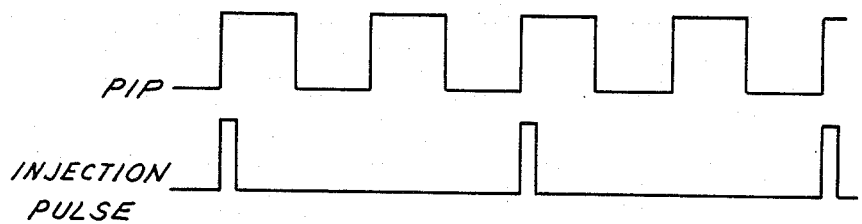
FIG. 2A shows the time relationship of a crankshaft position (PIP) signal occurring four times during an engine cycle of a four cylinder engine and a double firing having two injection pulses per engine cycle.
Figure 2B:
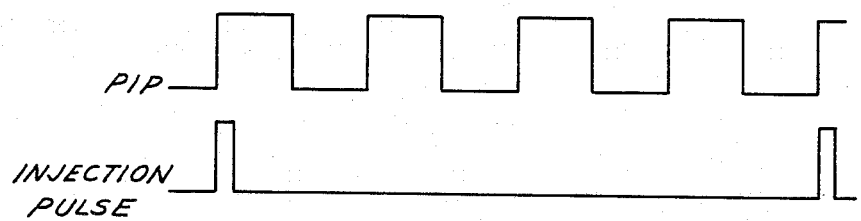
FIG. 2B shows the time relationship of a crankshaft position (PIP) signal occurring four times during an engine cycle of a four cylinder engine and a single firing having one injection pulse per engine cycle.

Referring to FIG. 1, a fuel injector's characteristic curve relating applied pulse width to amount of fuel flow per injection has a linear portion and a nonlinear portion at low fuel flow rates. That is, there is a minimum fuel injector pulse width below which the injector fuel flow becomes nonlinear. These pulse widths are within the range of normal engine operation, such as at or near idle, if the normal injector firing mode, that is, twice during each engine cycle as shown in FIG. 2A, is used. In order to avoid nonlinear and erratic fuel flow under these conditions, the fuel injectors are fired half as often, as shown in FIG. 2B, which allows a wider pulse width to be used, thereby again operating the injector in the desired linear range.

The horizontal axis of FIG. 1 is defined in terms of fuel injector current pulse width in the double fire mode (EFIPW). Thus, in the single fire mode the actual pulse width (2EFIPW) is two times the indicated double fire pulse width (EFIPW). For example, if the injector current pulse width during engine operation in a double fire mode (EFIPW) drops below 1.85 milliseconds, the engine control system changes to a single fire mode having a pulse width of two times EFIPW. If the engine is operating in a single fire mode having a pulse width of 2EFIPW greater than 4.10 milliseconds, corresponding to a double fire pulse width (EFIPW) of greater than 2.05 milliseconds, the engine control system changes back to a double fire mode with a pulse width of EFIPW. The different limits (1.85 and 2.05 milliseconds) depending on the direction of switching produces a hysteresis effect to limit hunting between single fire and double fire modes of engine operation.

When the absolute pulse width of each fuel injection is considered with respect to fuel flow per injection, as in FIG. 5, there is established an operating range from the pulse width. The double fire pulse width can decrease in magnitude to a pulse width of 1.85 milliseconds, at which point the system switches to a single fire pulse width of 3.70 milliseconds (i.e. two times 1.85). Each of the double fire injections provides Y fuel so as to provide 2Y fuel per engine cycle. Each of the single fire injections provides 2Y fuel so as to provide 2Y fuel per engine cycle. The single fire pulse width can increase in magnitude to a pulse width of 4.10 milliseconds, at which point the system switches to a double fire pulse width of 2.05 milliseconds (i.e. half of 4.10). Analogous to the previous fuel discussion, at the switch point, the amount of fuel provided by each single fire fuel injection (2x) is twice the fuel provided by each double fire injection (x).

Figure 3:
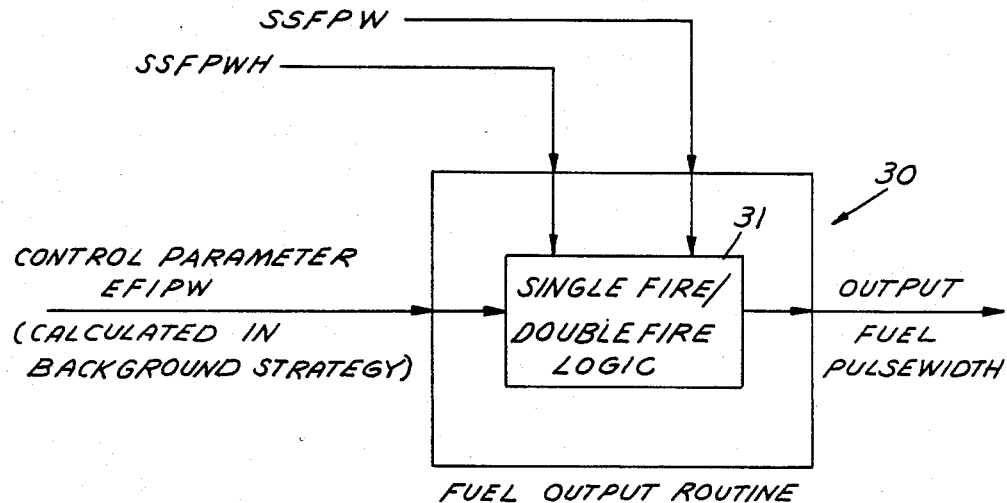
FIG. 3 is a block diagram of a fuel injection control system in accordance with an embodiment of this invention.

Referring to FIG. 3, a control system 30 includes a control module 31 having inputs of EFIPW, SSFPW, and SSFPWH. EFIPW is the desired amount of fuel during each engine cycle and is calculated in an engine control system. SSFPW is the minimum permissible pulse width before linearity occurs. SSSFPWH is a higher pulse width of greater magnitude and is used to avoid hunting between single and double fire to provide a hysteresis effect. Control module 31 selects between the selective single fire and selective double fires. The output from control module 31 is the output fuel pulse width.

Figure 4:
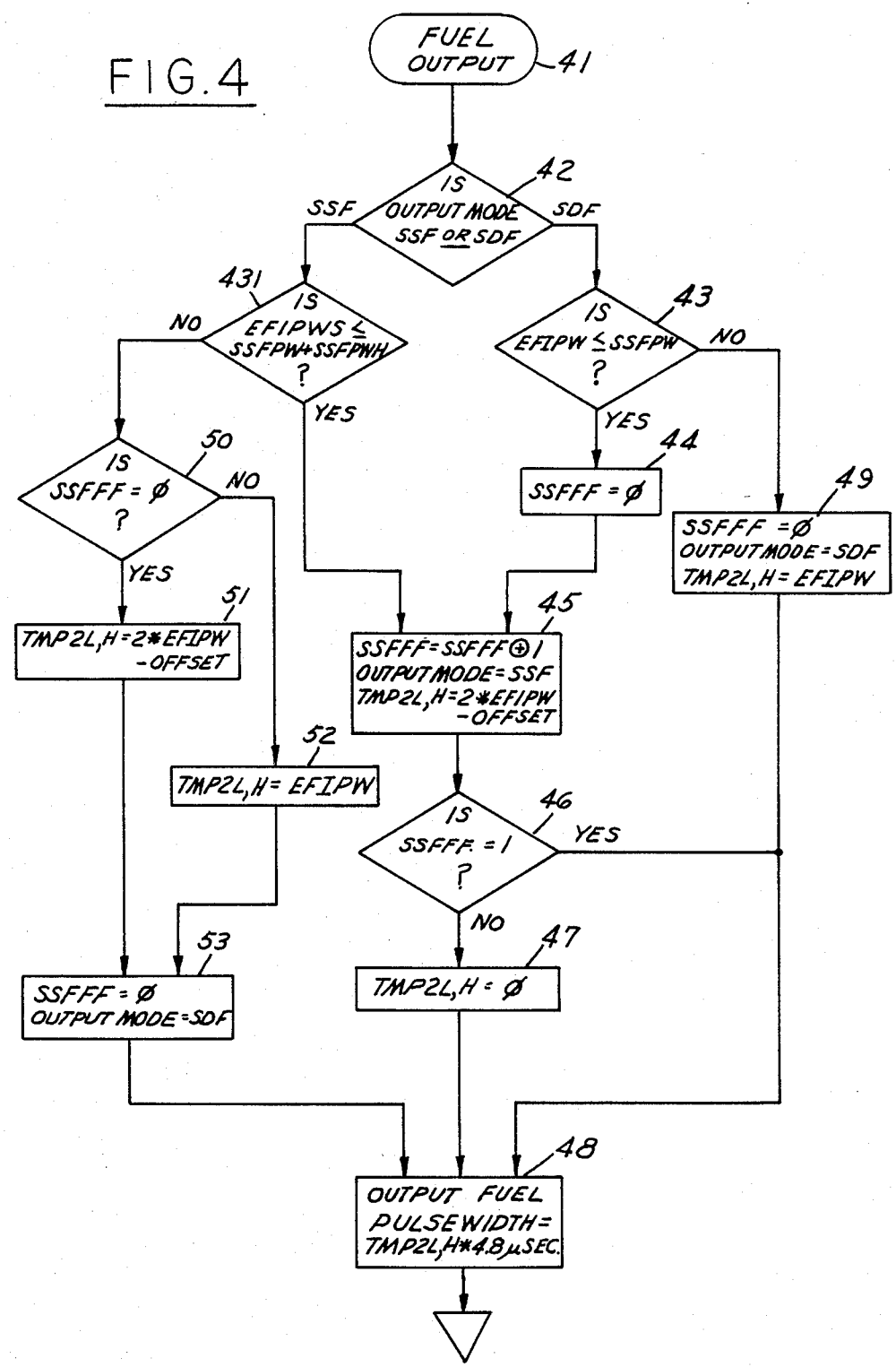
FIG. 4 is a block flow diagram of the operation of a fuel injection system in accordance with an embodiment of this invention.

Referring to FIG. 4, the logic operation within module 31 has an an input the desired fuel output as indicated at block 41. Typically, this is computed in an associated engine control computer. The logic flow from block 41 is to block 42 wherein it is determined whether the fuel system output mode is a selective single fire mode or a selective double fire mode. If the output mode is the selective double fire, logic flow goes to a block 43 wherein it is determined whether the desired pulse width is less than or equal to the selective single fire pulse width threshold as indicated in FIG. 1. If the answer is yes, logic flow proceeds to a block 44 wherein a logic state (denoted a selective single fire flip-flop (SSFFF)) is set equal to zero. From there the logic flow goes to a block 45 wherein a new SSFFF is determined by the exclusive OR sum of the old SSFFF and one. The output mode is also set equal to the selective single fire mode (SSF).

At a temporary register TMP2LH there is stored the quantity of two times the fuel injection pulse width (*EFIPW) minus an OFFSET term. The OFFSET term represents the amount of time it takes for a fuel injector to start delivering fuel. That is, in FIG. 5, it would represent the intercept of the fuel flow characteristic with the horizontal axis indicating absolute injector pulse width. From block 45, the logic flow goes to a block 46 wherein the selective single fire flip-flop (SSFFF) is tested to determine if it is equal to one. If the answer is no in block 46, logic flow goes to a block 47 wherein the temporary register TMP2LH is set equal to zero. If the answer is yes in block 46, logic flow goes to a block 48 wherein the output fuel pulse width is set equal to the contents of the temporary register TMP2LH times 4.8 microseconds. The logic flow from block 47 also goes to block 48, where the output fuel pulse width is set to zero, indicating that no fuel is to be injected.

Returning to block 43, if the desired fuel injection pulse width is not less than or equal to the selective single fire pulse width, i.e., the double fire mode is operating in the linear region of the injector, the logic flow goes to a block 49. In block 49, the selective single fire flip-flop is set equal to zero, the output mode remains as selective double fire and the temporary register TMP2LH is set equal to the desired fuel injector pulse width, EFIPW. The logic flow from block 49 goes to block 48.

Returning to block 42, if the output mode is the selective single fire, logic goes to a decision block 43 wherein it is asked if the desired fuel injection pulse width, EFIPW, is less than or equal to the sum of the selective single fire pulse width plus the selective single fire pulse width hysteresis threshold. If the answer is yes, then the logic flow is the same as that following block 44. That is, the sequence involves blocks 45, 46, 47 and 48.

On the other hand, if the answer is no in block 43, the logic sequence proceeds to a block 50 wherein it is asked if the selective single fire flip-flop is set equal to zero. If the answer is yes, logic flow goes to a block 51 wherein the temporary storage TMP2LH is set equal to two times the fuel injection pulse width less the offset. If the answer is no, and the selective single fire flip-flop is not equal to zero, logic flow goes to a block 52 wherein the temporary storage register TMP2LH is set equal to the fuel injection pulse width. The logic flow from either block 51 or 52 goes to a block 53. In block 53, the selective single fire flip-flop is set equal to zero and the output mode is established as being selective double fire. Logic flow from block 53 goes to block 48.

Figure 2C:
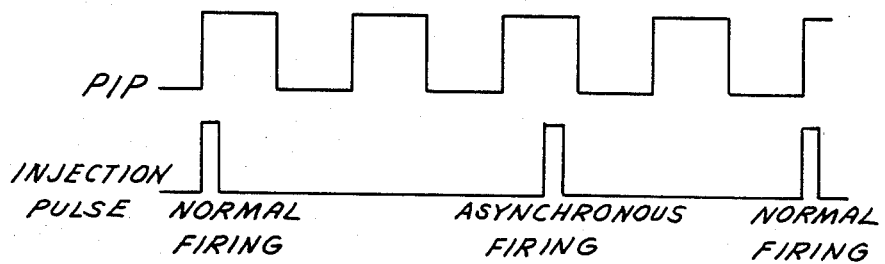
FIG. 2C shows the time relationship of a crankshaft position (PIP) signal occurring four times during an engine cycle of a four cylinder engine and fuel injection pulses including the addition of an asynchronous fuel injection to a single fire mode to accommodate a desired increased fuel supply in response to a demand in excess of the fuel provided by the single fire mode.

When the selective single fire mode is used, the individual fuel injections are spaced relatively far apart in time with respect to engine operating speed. It is possible for an engine condition such as throttle position and load to change significantly from one injection to the next injection. For example, if the engine load is low, a typical change may be the beginning of acceleration. In such a case, the injector fuel flow rate will be momentarily far lower than the demand for fuel. Although this difference or discrepancy is relatively short lived, it may result in an engine hesitation or stall. In order to compensate for a fuel flow deficiency and the possible result in engine hesitation, an extra injection is initiated immediately at a low engine revolution speed when there is selective single fire mode and a closed throttle to part throttle transition is detected. The width of such additional or a synchronous pulse is a function of engine revolution speed and engine coolant temperature. Such a pulse is illustrated in FIG. 2C.

Various modifications and variations will no doubt occur to those skilled in the art to which this invention pertains. For example, the particular magnitude of the switching threshold may be varied from that disclosed herein. These and all other variations which basically rely on the teachings through which this disclosure has advanced the art are properly considered within the scope of this invention.

We claim:

1. An engine control system for controlling a fuel injector in response to a desired fuel flow magnitude including:

a control means for determining the fuel injector pulse width if one fuel injection pulse is made during each engine cycle; for determining each fuel injection pulse width if more than one fuel injection pulses are made during each engine cycle; and for selecting the number of fuel injection pulses during each engine cycle so as to provide operation of the fuel injector in an advantageously linear portion of a fuel injector characteristic curve relating injection pulse width to injector fuel flow rate; and said control means being adapted to operate the fuel injector in a first mode with one fuel injection per engine cycle and to operate the fuel injector in a second mode with two fuel injections per engine cycle, having a hysteresis effect so that a first threshold of fuel injected during an engine cycle for switching from the first mode to the second mode is different from a second threshold of fuel injectd during an engine cycle for switching from the second mode to the first mode.

2. An engine control system as recited in claim 1 wherein said control means is further adapted to provide an asynchronous fuel pulse in the single fire mode so as to provide additional fuel during increased fuel demand.

3. An engine control system as recited in claim 2 wherein said control means is adapted to establish the second threshold in a region where the fuel injector characteristic curve, relating fuel injection pulse width to fuel flow rate during one injection, has a linear portion and the pulse width of each second mode injection associated with the second threshold is greater than the pulse width of each second mode injection associated with the first threshold, and the pulse width of each first mode injection associated with the second threshold is less than the pulse width of each first mode injection associated with the first threshold.

4. A method of controlling a fuel injector for an engine in response to a desired fuel flow magnitude including:

establishing a single fire mode operating a fuel injector once during an engine cycle;

establishing a double fire mode operating a fuel injector twice during each engine cycle;

establishing a first threshold injection pulse width for switching from the double fire mode to the single fire mode;

establishing a second threshold injection pulse width for switching from the single fire mode to the double fire mode, the second threshold injection pulse width being associated with a different fuel flow per engine cycle than the first threshold injection pulse width thereby establishing a hysteresis effect to avoid excessive switching between the single and double fire modes;

determining whether the engine is operating in the single fire or double fire mode;

determining the pulse width of the fuel injection;

comparing the pulse width of the fuel injection to a threshold pulse width;

switching from the double fire mode to the single fire mode when the pulse width of each double fire injection is less than the first threshold injection pulse width; and switching from the single fire mode to the double fire mode when the pulse width of each single fire injection is more than the second threshold injection pulse width.

5. A method of controlling a fuel injector for an engine as recited in claim 4 wherein the step of switching from the double fire mode to the single fire mode results in having the pulse width of a single fire injection be less than the pulse width of a single fire injection associated with the second threshold, and the step of switching from the single fire mode to the double fire mode results in having the pulse width of each double fire injection be more than the pulse width of a double fire injection associated with the first threshold.

* * * * *